July 14, 1953
H. R. ROGANT
2,644,993
LINE HOLDER
Filed May 4, 1950
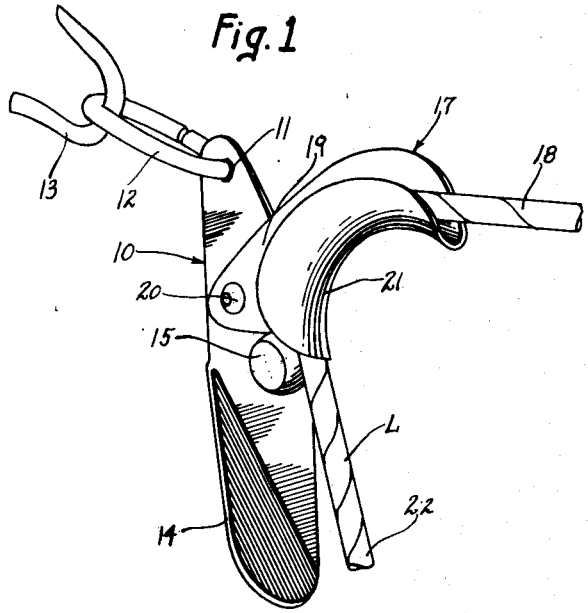
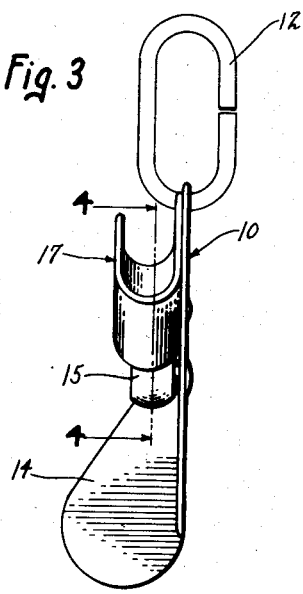
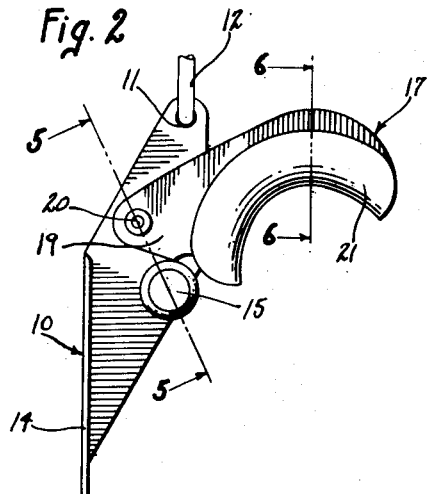
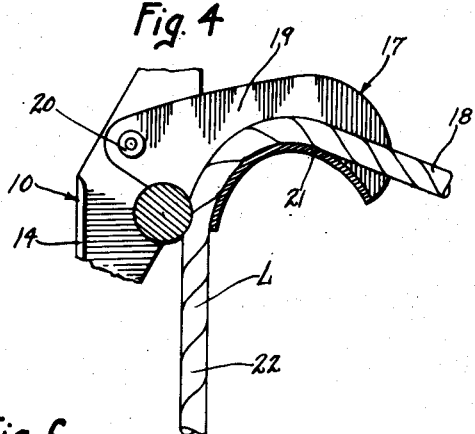
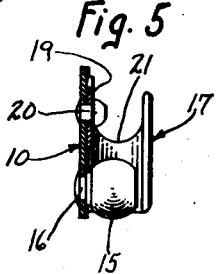
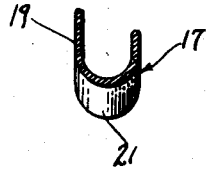
INVENTOR.
HUMBERT R. ROGANT
BY
ATTORNEY Patented July 14, 1953

2,644,993

UNITED STATES PATENT OFFICE 2,644,993

LINE HOLDER

Humbert R. Rogant, Willoughby, Ohio

Application May 4, 1950, Serial No. 159,972

1 Claim. (Cl. 24—134)

My invention relates to line holders, more particularly to holders for clothes lines, and the principal object of my invention is to provide new and improved holders of this character.

The prior art is replete with line holders of various types but it is significant that none has met with commercial success. Certain line holders require that the line be threaded through an opening for proper assembly and this is an annoying, time-consuming task. Other line holders are exensive to manufacture, and unreliable in operation and thus have not found commercial favor.

My invention provides a line holder that lends itself well to mass production methods and is of design which enables it to be produced economically. Further, the line holder of my invention provides for connection with a line merely by placing the line in an open channel forming part of the holder, and drawing on the line. Thus, a holder may be disposed at each line post, and a line of considerable length may be supported from subsequent posts without undue expenditure of time or energy. Also, the line may be easily removed, and the holders either left in position connected to respective posts, or they may be easily removed therefrom.

In the drawing accompanying this specification and forming a part of this application, there is shown, for purposes of illustration, an embodiment which my invention may assume, and in this drawing:

Figure 1 is a perspective view illustrating an embodiment of my invention in use, Figures 2 and 3 are side and end views of the embodiment shown in Figure 1, Figure 4 is a fragmentary sectional view corresponding generally to the line 4—4 of Figure 3, Figure 5 is a fragmentary sectional view corresponding generally to the line 5—5 of Figure 2, and Figure 6 is a transverse sectional view corresponding generally to the line 6—6 of Figure 2.

Referring to the drawing, the embodiment of the invention herein disclosed comprises a body of substantially flat depending plate member 10 which is preferably formed of thin, sheet material and thus lends itself well to sheet-metal stamping operations. The body is adapted to be swingably mounted from a support and, as herein shown, is formed at one end with an aperture 11 for passing a link 12. The link may be looped over a hook 13, or the like, which may be secured to a support, such as a clothes-line supporting-post (not shown).

The opposite end of the body 10 is formed to provide a laterally extending tab 14, the purpose of which will later be apparent. As best seen in Figures 1 and 3, the body 10 is generally flat, except for the tab 14, and has abutment means on the portion intermediate its ends. In the embodiment herein disclosed, the abutment means is provided by a rounded head 15 having a reduced rivet portion 16 which passes through an opening in the body 10 and is secured to the body in any suitable manner, such as by peening or expanding its extremity.

A clamping arm means 17 is shiftably carried by the body 10, and has a portion adapted to receive the line L. In the embodiment herein disclosed, the arm means is preferably formed of thin sheet material, and thus lends itself well to sheet-metal stamping operations. As herein shown, the arm means comprises a generally flat portion 19 which is pivoted flat-wise to the intermediate portion of the body, as by means of a pivot 20.

The arm means 17 further comprises a lip 21 extending laterally from the flat portion 19 and providing an open channel for receiving the line L. As best seen in Figures 4 and 6, the channel is curved both transversely and longitudinally to provide an arcuate line receiving groove, and the longitudinal curvature is in excess of ninety degrees so that a smooth surface is at all times presented to the line, thus eliminating danger of fraying or cutting of the line.

In operation, a user may position the line with the holder merely by placing it within the open channel and moving the arm means 17 and body 10 sufficiently to pass the line adjacent to the rounded head 15. Assuming that the extremity of line portion 18 is secured to a support, sufficient pulling force on line portion 22 will cause line portion 18 to become taut. When pulling force on line portion 22 is released, resultant pulling force on line portion 18, caused by tautness, or the weight of clothes supported on such portion, will cause arm means 17 to swing the body 10 about the pivot formed by the link 12 and in a direction toward the pulling force so as to present the abutment means to the arm means. Simultaneously, the arm means 17 is caused to swing about the pivot 20, with the result that the line is firmly clamped between the abutment means and a smooth surface of the channel. It is pointed out that the roundness of the head 15 is generally complementary to the transverse curvature of the channel so that the line is squeezed to a shape corresponding to the shape of the channel.

Since the body 10 is shiftably carried by a support, it may swing to any position necessary to properly align with the pulling force on line portion 18 and thus no side thrust is placed on the clamped part of the line L. It will be appreciated that the body 10 acts as a lever since it is caused to pivot about the link so as to thrust the rounded head 15 in a direction toward engagement with the arm means. The arm means, in turn, is caused to swing about its pivot with the body and rotate in a direction toward the rounded head. Thus, the body 10 and arm means are caused to swing in opposite directions and in effect, compound lever action results to firmly clamp the line.

To release the line, it is merely necessary to press on the tab 14 in a direction toward the support. Such action causes the body 10 to swing about the link 12 and move the rounded head 15 away from clamping engagement with the adjacent portion of the arm means 17.

In view of the foregoing, it will be apparent to those skilled in the art that I have accomplished at least the principal object of my invention, and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

A releasable line holding device comprising a substantially flat depending plate member having means at its upper end for attaching the same to a fixed support, an abutment including an enlarged head fixedly secured to and projecting outwardly from an intermediate surface portion of said plate member adjacent one edge thereof, and a clamping arm pivotally mounted adjacent the opposite edge of said plate member above said abutment in offset spaced relation thereto to extend said arm over said abutment, said arm being of longitudinally and transversely curved configuration to provide an arcuate groove for smoothly receiving therein a curved angular portion of the line to be held, the end of said groove adjacent said pivotal connection being engageable by gravity against the side surface of said abutment head remote from said pivotal connection to normally dispose said clamping arm in substantial horizontal projecting relation to said depending plate member, whereby the weight of a flexible line insertable laterally into said arcuate groove rocks said arm downwardly relative to said plate member to firmly clamp said line between said groove end and said abutment head surface.

HUMBERT R. ROGANT.

References Cited in the file of this patent

UNITED STATES PATENTS

| Number | Name | Date |
|---|---|---|
| 274,935 | Green | Apr. 3, 1883 |
| 356,225 | Dufeu | Jan. 18, 1887 |
| 436,832 | La Grange | Sept. 23, 1890 |
| 668,499 | Dalton | Feb. 19, 1901 |
| 979,118 | Wolf | Dec. 20, 1910 |
| 1,074,736 | Noll | Oct. 7, 1913 |
| 1,605,503 | Boenning | Nov. 2, 1926 |

FOREIGN PATENTS

| Number | Country | Date |
|---|---|---|
| 123,777 | Switzerland | Dec. 16, 1927 |
| 210,602 | Great Britain | Feb. 7, 1924 |
| 251,103 | Switzerland | July 1, 1948 |